United States Patent
Galvin

(10) Patent No.: US 7,573,990 B2
(45) Date of Patent: Aug. 11, 2009

(54) ACCUMULATIVE DECISION POINT DATA ANALYSIS SYSTEM FOR TELEPHONY AND ELECTRONIC COMMUNICATIONS OPERATIONS

(75) Inventor: Brian Galvin, Albuquerque, NM (US)

(73) Assignee: Genesys Telecommunications Laboratories, Inc, Daly, CA (US)

( * ) Notice: Subject to any disclaimer, the term of this patent is extended or adjusted under 35 U.S.C. 154(b) by 299 days.

(21) Appl. No.: 11/462,316

(22) Filed: Aug. 3, 2006

(65) Prior Publication Data

US 2007/0263593 A1    Nov. 15, 2007

Related U.S. Application Data

(60) Provisional application No. 60/796,989, filed on May 1, 2006.

(51) Int. Cl.
*H04M 15/00*  (2006.01)
*H04M 7/00*  (2006.01)

(52) U.S. Cl. ............... 379/112.06; 379/112.08; 379/220.01

(58) Field of Classification Search ............ 379/32.05, 379/112.01, 112.06, 133, 134, 136, 139, 379/220.01, 221.05, 219, 265.01, 265.02, 379/265.06, 268.09, 265.11, 266.02, 266.06, 379/266.1, 258, 112.08
See application file for complete search history.

(56) References Cited

U.S. PATENT DOCUMENTS

| | | | |
|---|---|---|---|
| 5,787,160 A * | 7/1998 | Chaney et al. | 379/112.06 |
| 5,809,121 A * | 9/1998 | Elliott et al. | 379/127.01 |
| 6,195,416 B1 * | 2/2001 | DeCaluwe et al. | 379/32.05 |
| 2002/0057678 A1 * | 5/2002 | Jiang et al. | 370/353 |
| 2004/0071275 A1 * | 4/2004 | Bowater et al. | 379/88.18 |
| 2005/0069102 A1 * | 3/2005 | Chang | 379/88.18 |
| 2006/0018440 A1 * | 1/2006 | Watkins et al. | 379/88.01 |
| 2006/0031510 A1 * | 2/2006 | Beck et al. | 709/226 |
| 2006/0187851 A1 * | 8/2006 | Waldorf et al. | 370/252 |
| 2006/0209797 A1 * | 9/2006 | Anisimov et al. | 370/352 |
| 2007/0183339 A1 * | 8/2007 | Rousell et al. | 370/252 |
| 2008/0046504 A1 * | 2/2008 | Deryugin et al. | 709/202 |
| 2008/0134018 A1 * | 6/2008 | Kembel et al. | 715/234 |
| 2008/0229217 A1 * | 9/2008 | Kembel et al. | 715/760 |

* cited by examiner

*Primary Examiner*—Binh K Tieu

(57) ABSTRACT

A system for generating usage statistics for a communications routing system from data generated at routing points and at end points of the system has a processor having access to the communications routing system for analyzing the data and generating the statistics, and a server having access to the processor for rendering the generated statistics into a format for display. The data used to generate the statistics includes routing path information for events routed through the communications routing system and optionally interaction histories recorded at certain routing points and end points in the communications routing system.

33 Claims, 4 Drawing Sheets

ACCUMULATIVE DECISION POINT DATA ANALYSIS SYSTEM FOR TELEPHONY AND ELECTRONIC COMMUNICATIONS OPERATIONS

CROSS-REFERENCE TO RELATED APPLICATIONS

The present invention claims priority to a U.S. provisional patent application Ser. No. US60/796,989 filed on May 1, 2006 entitled, "Contact Center Data Analysis for Operational Optimization". The disclosure is included herein at least by reference.

BACKGROUND OF THE INVENTION

1. Field of the Invention

The present invention is in the field of telephony and electronic communications systems and data analytic approaches and pertains particularly to a system for statistically analyzing data acquired over multiple communications system entry and decision points in a given communication route.

2. Discussion of the State of the Art

Communications centers, including call centers, perform extensive analysis of data about calls and callers to produce statistics that are used to improve center service and performance. Of particular importance is data that yields information about the behavior of callers during a call. This data is analyzed based on a call and the caller and the resulting transaction is analyzed for useable statistical data. For each decision point in a call flow, decision percentages are assessed, based on the likelihood of the caller making a decision A or B, or a decision A, B, or C. Resulting statistical data may then be provided to call center operators, as well as to marketers, for the purpose of improving service and/or marketing strategies.

A problem with the current state of analysis is that data is only analyzed for caller behavior at each decision point the caller arrives at in the system without considering previous decision points or how the caller got to that particular decision point.

It has occurred to the inventor that consideration of the history of the caller's experience during the call and how the caller got to a particular decision point may provide better statistics that allow a much more accurate assessment of the potential outcome of the call.

What is clearly needed is a system and method for analyzing caller data that not only includes activity at each decision point but also includes data from previous points and data about how the caller arrived at a particular decision point, including the complete path of the call. A system such as this would provide much better statistics about callers using a particular communication system usable for fine tuning service, system topology, and marketing strategies used with the system.

SUMMARY OF THE INVENTION

A system is provided for generating usage statistics for a communications routing system from data generated at routing points and at end points of the system. The system includes a processor having access to the communications routing system for analyzing the data and generating the statistics, and a server having access to the processor for rendering the generated statistics into a format for display. In a preferred embodiment, the data used to generate the statistics includes routing path information for events routed through the communications routing system and interaction histories recorded at certain routing points and end points in the communications routing system.

In one embodiment, the communications routing system is logically classed as a single multimedia routing system comprised of separate physical communications routing architectures each handling different media types. In another embodiment, the communications routing system is one of a telephone routing system, an email routing system, or a voice over Internet protocol (VoIP) routing system. In one embodiment, the routing points include system entry points and intermediate decision points and the end points are final destinations for events.

In one embodiment, the interaction histories include final results of event handling recorded at end points. In one embodiment, the processor is a dedicated node having connection to each final destination point of the system. In another embodiment, the processor has access to all of the routing points and end points of the system. In still another embodiment, the server and processor are components of a same machine.

In one embodiment, the data generated at routing points and end points is generated in the form of an extensible markup language-based data set. In one variation of this embodiment, the routing points in the system include telephone switches, interactive voice response interfaces, and interactive queues.

According to one aspect of the invention, the system further includes a software application distributed in parts to the routing points and end points of the communications routing system, the distributed parts responsible for data aggregation and forwarding.

According to another aspect of the present invention, in a communications routing system, a method is provided for collecting route path information and interaction information of a communications event routed through the system for use in generating usage statistics. The method includes the acts (a) recording the identification and location of a system entry point at which the event first arrived into the system and recording any interaction result produced at that entry point, (b) generating machine-readable text of the recorded data, (c) routing the event to a next routing point, (d) recording the identification and location of the next routing point to which the event is routed and any interaction result at that routing point, (e) generating machine-readable text of the recorded data, and (f) sending the aggregate machine readable text to a statistics generator.

In one aspect in act (a), the entry point is a telephone switch and the interaction is interactive voice response (IVR). In a variation of this aspect, in act (b), the machine-readable text is XML-based. In one aspect, in act (c), the determination of the next routing point is based at least in part on result of any interaction at the entry point. According to another aspect in act (c), the determination of the next routing point is a default routine. In one aspect, in act (d), the next routing point is an IVR system.

According to one aspect, in act (f), the aggregate text is assembled at each point and forwarded with the event to the next point, the aggregate forwarded when the point is a final destination for the event. Alternatively, in act (f) the aggregate of texts are assembled in a third party node monitoring the routing points when the event terminates, the aggregate then forwarded to the statistics generator. In still another aspect, in act (a) the entry point is a Web server and the interaction is selection of an option on an electronic form.

BRIEF DESCRIPTION OF THE DRAWING FIGURES

DETAILED DESCRIPTION

Figure 1:
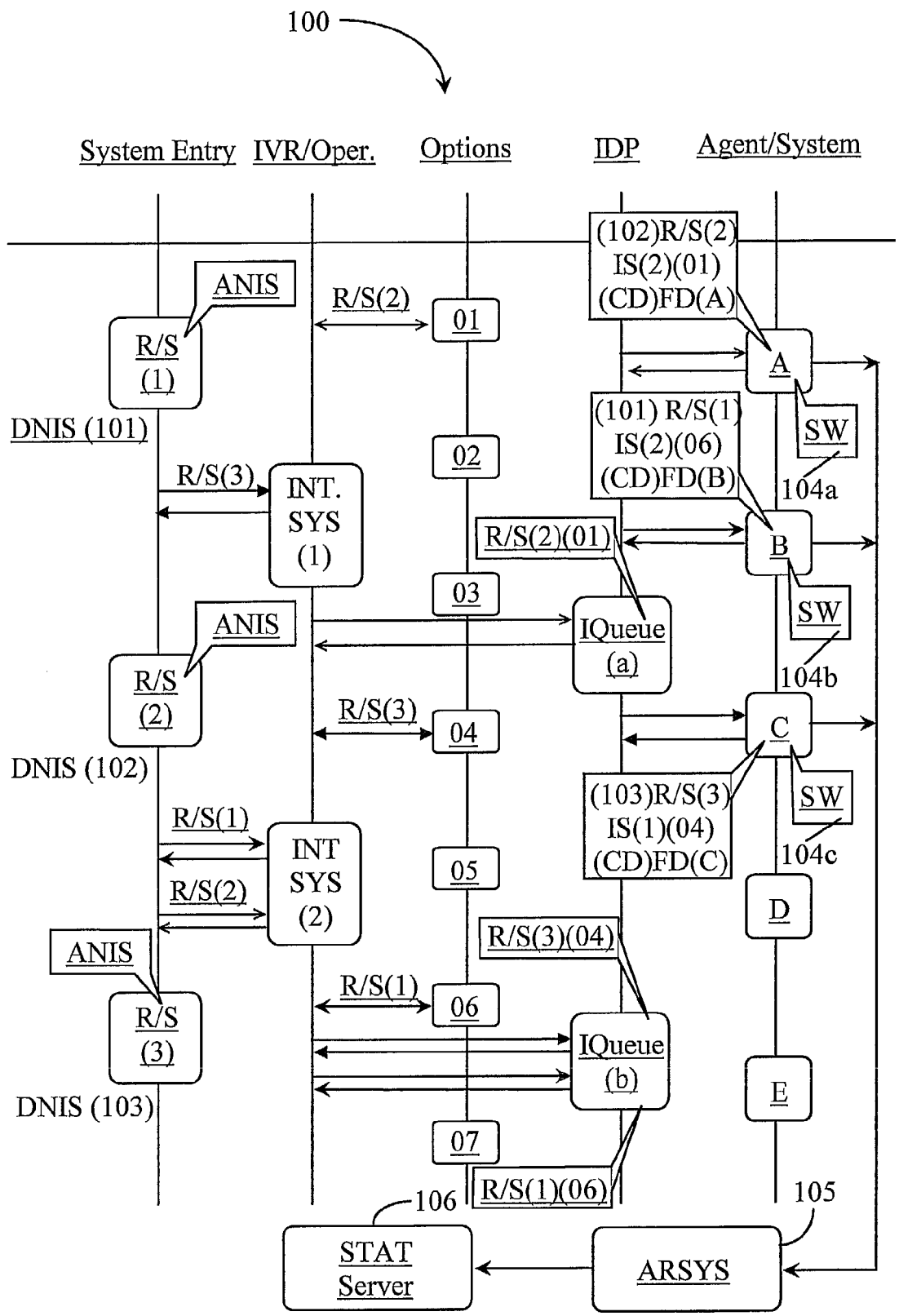
FIG. 1 is communication flow diagram illustrating communication path information and interaction data aggregation for statistical analysis according to an embodiment of the present invention.

FIG. 1 is communication flow diagram 100 illustrating communication path information and interaction data aggregation for statistical analysis according to an embodiment of the present invention. Diagram 100 is divided into 5 exemplary routing points. Reading from left to right, the routing points are a system entry point; an interactive voice response (IVR) unit or live operator; IVR options for further routing; an intermediate decision point (IDP); and a final destination, which may be a live agent or system. The exemplary routing points may represent points in a call center routing system in this example. However, routing points exist in a wide variety of voice and electronics communication systems. One with skill in the art will appreciate that other media types may be represented as well without departing from the spirit and scope of the present invention. This example of a call center flow is exemplary only and should not be construed as limiting in any way.

The system entry point includes 3 router/server (R/S) nodes. These are an R/S nodes (1), (2), and (3). In this example, the system has 3 entry points. There may be more or fewer than 3 entry points and those points may be switches, routers, servers, or other machines capable of accepting communication events. In this example the system entry nodes are telephony nodes capable of determining destination number of the call through a standard destination number identification service (DNIS) and/or the origination number for the call through standard automated number identification service (ANIS). Other systems supporting other media types may use different protocols or services to determine caller identification and the destination desired by the caller. For example, an email routing system would identify the caller by the "from" email address and the destination by "to" email address.

In this telephony example, there are 3 callers 101, 102, and 103 that have entered system 100 each at a different entry point. Caller 101 placing a call to a telephone number identified through DNIS has entered the system through R/S (1). Caller 102 has entered the system through R/S (2), and caller 103 has entered the system through R/S (3). The numbers identified through DNIS may be the same number or different numbers.

Each entry point may acquire the telephone numbers of each caller through ANIS as described above. Likewise, upon caller identification at system entry points, additional information may be acquired about the caller if the caller has a history with the system or is otherwise known to the system.

Each caller 101-103 is routed to one of 2 interaction points or decision points in each routing path. Such routing may be based on the destination number identified for each caller. The decision to route a caller to one of the 2 interaction systems might be based on some other information. In this example, the first decision points are interactive system (1) and interactive system (2). These systems may be IVR systems or live operators that interact with the callers for further routing.

In this example, caller 103 who entered the system through entry point (3) is routed to interaction system (1). Caller 101 is routed to interaction system (2) and caller 102 is routed to interaction system (2). In a preferred embodiment, any information about the callers including their telephone numbers and destination numbers called is forwarded along each call path to the next decision point. Also in a preferred embodiment, the call path including identification of the entry system that each call arrived at is documented and forwarded with each call.

In this example each caller receives IVR treatment. Interaction systems (1) and (2) each have multiple selectable options 01-07 to choose from. The options may be the same for both interaction systems or each system may support a different set of options to choose from. In this example, it will be assumed that options 01-07 are the same for both interaction systems. In this example, caller 101 chose option 06 during interaction. Caller 102 chose option 01, and caller 103 chose option 04. The options that callers choose may influence their further routes through communication system 100. Also, choosing the options marks another data point that may be forwarded along with the call data and caller data for later analysis.

In this example, there is an intermediate decision point that includes 2 interactive queues (IQueues). These are IQueue (a) and IQueue (b). IQueues (a) and (b) may provide yet further selectable options to the callers (options not illustrated). In one embodiment, they may not be interactive queues but simply first in first out (FIFO) or some other type of queue. Determination of which queues callers will be deposited in may be influenced by which options were previously selected.

In this example, caller 101 who entered through entry point (1) and was treated by interaction system (2) and who chose option 06 is queued in interactive queue (b). Caller 102 who entered through entry point (2) and was treated by interaction system (2), but chose option 01 is queued in interactive queue (a). Caller 103 who entered through entry point (3) and was treated by interaction system (1), but chose option 04 is queued in interactive queue (b). Up to this point, the complete call path and interaction history is available from the point of the queues.

Based upon some interaction in queue or not, each call is routed on to its final destination (FD). The column labeled agent/system includes agents A-E as possible final destinations out of queues (a) and (B). FDs A-E may include automated treatments in place of live assistance. In this example, caller 101 is routed from queue (b) to agent B. Caller 102 is routed from queue (a) to agent A. Caller 103 is routed from queue (b) to agent C. Now all of the caller information including complete call route through the system and option selection history is available at the final destination of the call.

At this point, the complete data set for each caller, including interaction history and call path through the system from entry point to final destination is available at the final destination of the call. In this example, agents A, B, and C have software instances 104a, 104b, and 104c respectively. Software 104 is capable of stripping the complete data from the call including call route and interaction history. The stripped data may or may not retain the identification of the caller. In one embodiment, the data is forwarded along with the results of interaction at the final destination after each call handling to an analyzing and reporting system (ARSYS) 105. ARSYS 105 compiles all of the data and computes certain general statistics related to all of the calls reaching final destinations and handled by agents. Agents D and E may be assumed to have instances of SW 104 as well.

SW 104 may work in the background as agents handle calls by stripping at least the forwarded call path and interaction history data available for each call received. SW 104 may wait until the conclusion of each call so that the results of the call may also be tagged to the stripped data thus made available for analyzing. Along the call route, each system that can provide data about the call such as interaction results may have some version of software running on it to enable generation of machine-readable script that represents the data. At some points in the system existing modules may already provide some of the required information such as message route details for emails. In an email routing system having a queue the destination address of the email message may not be the same destination that the message will ultimately be forwarded to. Email is also asynchronous messaging, meaning that no interaction points would be included in its path unless it was an email correspondence chain. Instant messaging may include points of interaction and selection of options constituting an interaction history.

At some point the required data for analyzing is uniformly presented to ARSYS 105 in some machine-readable text or script. In one embodiment, SW 104 has an XML generator and may present the information in some XML-based format to ARSYS 105. In one embodiment, every point in the path of the communication is capable through software of the present invention of rendering the required data as XML-based text and forwarding that text on the next point in the path where new data may be appended to the forwarded XML until ultimately the final destination has the complete data accept for handling results.

ARSYS 105 is capable of compiling new data with data it already has and analyzing that data according to one or more enterprise rules and to generate a fresh batch of statistics. The new statistics are then forwarded to a statistics server 106. Server 106 may be a central point server that may be accessed by administrators or other authorized personnel to acquire any new statistics for consideration in implementing architectural changes to system 100. Marketers may access server 106 for statistics that may shape how products are marketed including what interactive options should be designed and presented or how existing option should be changed.

In one general example, ARSYS may generate statistics that expose a particularly weak point of sale. Assume that only 30% of callers entering the system through system entry point (1), interacting at interactive system (2) and choosing one of options 01-04, routed to queue (b), and ending up with agents D or E actually result in a sale. This may be compared to a statistical fact that 80% of callers entering the system through entry point (3), interacting at interactive system (2) and choosing one of options 01-04, routed to queue (a), and ending up with agent B or C result in sales. The differences in the statistical data sets for call path are entry points (1) and (3), queues (a) and (b), and the agents who handled those calls. The statistical data may be considered with other known statistical information already known to the system. Perhaps agents B and C are veteran agents while both agents D and E are inexperienced. Queues (a) and (b) may be identical and may have identical wait times. Both call sets went through the same interaction system and all callers selected one of the same range of options. Perhaps entry system (1) has had a call forwarding time averaging 5 seconds longer than entry system (3).

Taking the above information into account, it may be clear that one of the veteran agents should swap positions with one of the inexperienced agents. It might also be prudent to add an entry system to help balance the call load over the total of systems. The fact that there is a 50% difference in sales for a potentially large number of callers is motivation to make the changes. The sales percentage would not, without the invention, be known to the system in the detail that the present invention allows. The process of the invention helps to pinpoint potential problems in the system. The sales reports for agents B, C, D, and E taken without considering complete call path and interaction history may not reveal a large discrepancy in overall sales considering total calls handled by all the agents for a period. Perhaps the problem defined above is mostly due to the longer wait time at entry point (1) rather than actual agent skills. So those callers entering through system (1) are a bit miffed before the interaction process and may still be somewhat agitated by the time they reach live agents D and E making the sales for those callers generally harder to close. Once changes have been made to the system, the same sets of statistics may be generated again for a next period for the same call paths and interaction histories to see if the changes made have solved the problem.

It will be understood by one skilled in the art that the circumstances and rules as well as the analytic process can vary widely depending on the type and architecture of a communications system contains and which media types it supports without departing from the spirit and scope of the present invention. In fact a communication system may be entirely automated without live agents and still benefit from aggregation of communication paths and interaction histories for each event and using those in the analytic process to generate useable statistics for administrator or marketers.

Figure 2:
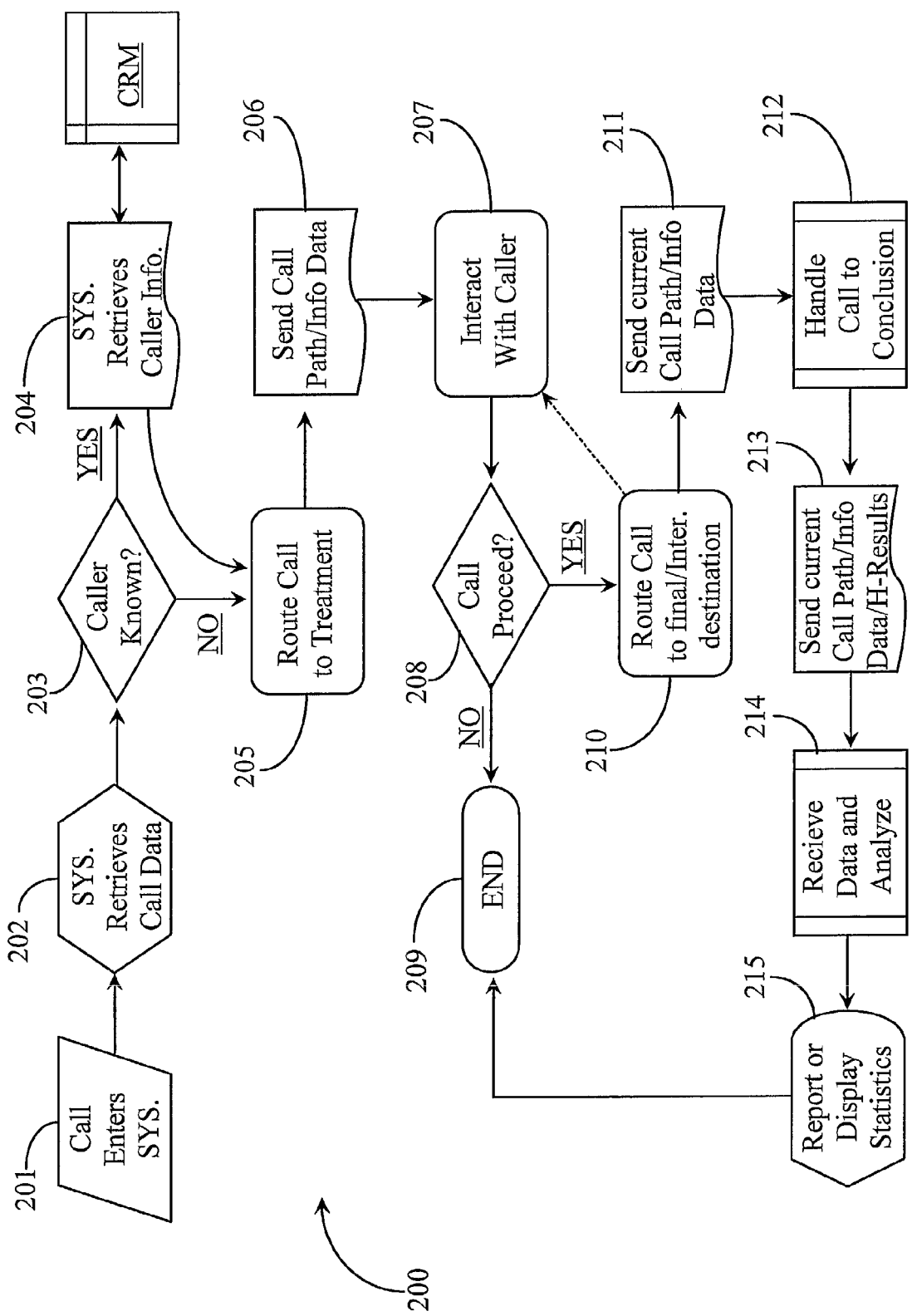
FIG. 2 is a process flow diagram illustrating steps for collecting information during an interaction routing sequence according to an embodiment of the present invention.

FIG. 2 is a process flow diagram 200 illustrating acts for collecting and forwarding information during an interaction routing sequence according to an embodiment of the present invention. At act 201, a caller enters the communications system at an entry point in the system. At act 202, the system retrieves caller data like destination number and/or origination number. At act 203, the system determines if the caller is known to the system. This may be accomplished by looking up the caller's number or identification in a database maintained by the system. If at act 203, the caller is known, then at act 204 the system retrieves caller information from a database like a customer relations management (CRM) database.

Once the caller information is retrieved, then at act 205 the caller is routed to treatment. If at act 203, the caller is not know to the system, for example, a first time caller, then at act 205 the caller is routed to treatment. At act 206, the call path data and caller info if any is forwarded on to the treatment node or operator equipment. At act 207, the treatment system or operator interacts with the caller. This point may be considered a decision point in the call path for the caller because the caller may interact and make an option selection, which may influence the further routing of the call.

At act 208, the system determines if the call will be routed further from the current point in the call flow. This may depend on whether the caller elects to proceed by making a selection of available options presented. If it is determined at act 208 that the call will not proceed, then the process may end at act 209. At this point the only path history is that the caller entered through a specific entry point and was routed to a specific interaction point. This may or may not be enough information to use in statistical analysis. However, any information gleaned may be forwarded at the point of termination of the call to an analysis and reporting server like ARSYS 105 described above. If there are many calls terminating at a specific interaction point, there may be a problem.

If at act 208 the call is to proceed, then at act 210 the call is routed to a final or to an intermediate decision point depending on the communication system architecture. There may be more than one intermediate interaction point before a final destination is determined. Therefore, act 210 may, in one embodiment, loop back to act 207 resulting in further interaction with the caller at act 207 and then back to act 208. At step 211, the current call path and caller information including the results of interaction are sent with the call to the next hop or destination, in this case, the final destination. This information includes the complete call path through the system and the interaction results made by the caller.

At act 212, the call is handled to some conclusion by an automated system or by a live agent. Act 212 may represent the final destination of the call in the system after which the call is disposed of. Once the call is satisfied in act 212, the received call path, caller information, if any, and interaction results are sent to a data analyzing and reporting system at act 213. The data includes the results of the call handling, for example, whether the call resulted in a successful transaction or not.

At act 214, the system receives the data and analyzes the data in light of the current statistics held by the system. The total statistical base may change fluidly as new call data is analyzed as it is received. Act 214 is a continually running process in a preferred embodiment constantly receiving new data for generating statistics. At act 215, the analyzing and reporting system reports or displays the most current statistics available for any given period of time. At act 209 then the process ends for that call. It is noted herein the entire process 200 runs in parallel for all of the calls currently in the system at any given time. In one embodiment, only data from calls that make it to final destination and conclusion are retained and analyzed. In another embodiment, partial data sets from calls that are dropped or terminate before the final routing are also retained and included in analyzing. In the latter case a system point may automatically forward its current data to a central analyzing and reporting system as soon as the call is terminated. The system may make note that the result of the call was termination before conclusion. The data about calls that terminate before final routing may be important to analyze in order to reduce those instances in the system.

Process 200 may be that of a wholly automated electronics communication system or that of a telephony system without departing from the spirit and scope of the present invention. Likewise, the process may be extended by adding intermediate decision points or reduced in length by subtracting intermediate points. Moreover, the nature of interaction and selection of options may, in part determine the number of intermediate points. In fact a call route or path may be further extended from the final destination by re-directing the call or routing the call to another destination. Such further activity may be considered in analysis as well.

Figure 3:
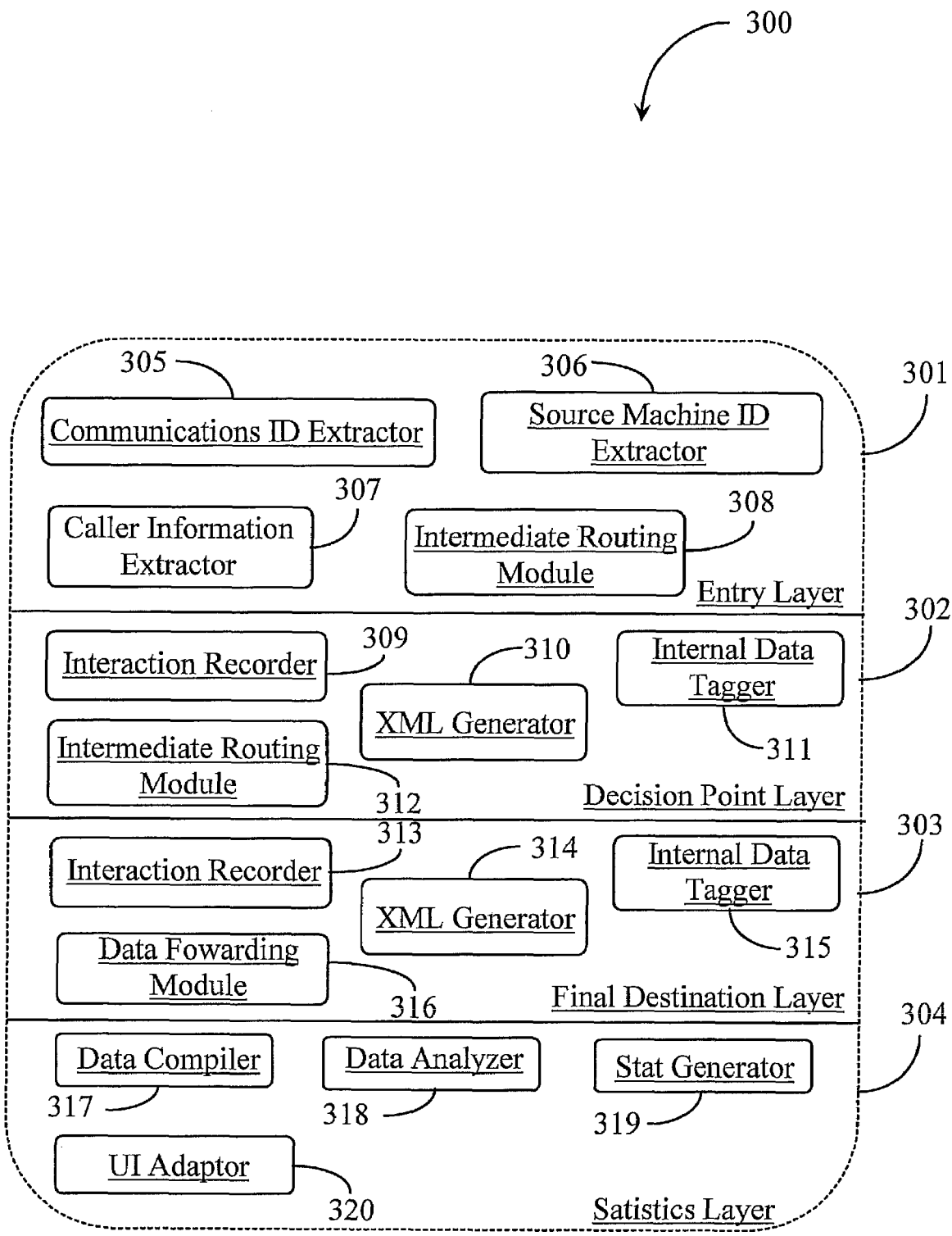
FIG. 3 is a block diagram illustrating basic software layers and components for obtaining and presenting caller history and path information according to an embodiment of the present invention.

FIG. 3 is a block diagram 300 illustrating basic software layers and components for obtaining and presenting caller history and path information according to an embodiment of the present invention. Diagram 300 logically represents a software utility for collecting communication path information and interaction history of callers traversing a communications route of a communication s system. Block 300 may be distributed in parts over several machines with departing from the spirit and scope of the present invention.

Block 300 contains 4 logical layers. These are an entry layer 301, a decision point layer 302, a final destination layer, 303 and a statistics layer 304. In one embodiment, individual layers 301-304 may be individually distributed to such nodes determined to be dedicated nodes. For example, layer 301 may be distributed to all entry nodes of a system. Layer 302 may be distributed to all decision point nodes in the system. Layer 303 may be distributed to all final destination points in a system. Layer 304 may be provided at a central reporting station or server. Alternatively, each node in a communications routing system may be provided with all two or more of the layers in case the node is used both as an entry point and an intermediate decision point or the like. There are many possibilities.

Layer 301 includes a communications identification extractor 305. Extractor 305 may simply be an existing service like ANIS for identifying the number of the telephone or other device the caller is calling from. In other embodiments, extractor 305 may identify an IM handle, a Chat handle, and email address, a password, or a pin number. The purpose of extractor 305 is to provide the identification of the caller. Layer 306 includes a source machine ID extractor 306. Extractor 306 may provide the identification of a machine the caller is using to communicate. A cell phone serial number, a computer machine address on a network, or other unit identification falls into this category. Acquiring the identification of the caller and the identification of the device the caller is using to communicate is not specifically required in order to practice the present invention. However it may be useful in helping to locate information about the caller. Likewise, knowledge of the identification of a source machine connected to a network, for example, may be used to identify a part of the communications path before the system entry point such as a gateway from a known sub network.

Entry layer 301 includes a caller information extractor 307 that performs a system lookup to determine if there is any information about the caller already known to the system and retrieves that information to include it with the call. It is not required that information about a caller be made part of the communication path and interaction data that is collected as the call is routed through the system. In some cases, the caller information may simply be forwarded to the final destination point of routing when that point is determined with certainty.

Layer 301 includes an intermediate routing module 308 that provides the further routing options from the point of the particular point of entry hosting the software. In one embodiment, software 301 is directly integrated with existing routing routines whether executed a single application on a central transaction server or whether it is distributed in parts over several nodes. In another embodiment, software 301 may standalone from any actual routing routines, but may be leveraged for routing input by the routines that are in place.

Entry layer 301 contains all of the required components in this example to practice the invention from a point of entry of a routing system. The fact that communication events arrived at the entry point is preserved and forwarded on to the next hop in the system.

Block 300 includes a decision point layer 302. For the purpose of discussion, a decision point is any point in a routing system where a caller makes a decision that results in further routing of the call. Layer 302 may be distributed to an IVR peripheral or to a standalone unit. Layer 302 includes an interaction recorder 309 capable of recording the selections of options made by a client using an IVR unit for example. In one-embodiment recorder 309 tracks interactive selections or clicks in an interactive Web form accessed by the client. The form of interaction recorder 309 will depend on the nature of the routing system. Recorder 309 may capture voice selection, pushbutton selection, Web clicks, and the like.

Layer 302 has an XML generator 314 for generating machine-readable script that represents the interaction or caller behavior captured by recorder 309 in this example. In a telephony routing system, the XML-based rendering of the caller behavior is interaction history at that point. Layer 302 may also include an internal data tagger 311 for tagging an existing data set with any new data generated at that decision point such as the interaction results and the latest call path addition. Like entry layer 301, decision point layer 302 includes an intermediate routing module for routing the call on to the next destination.

Practice of the present invention in a telephony or voice over Internet protocol (VoIP) routing system does not depend on generation of XML script. Other protocols for generating machine-readable scripts may also be used. XML-based markup is simply convenient in a telephony routing environment and is already used in many telephony routing applications such as call control XML (CCXML) and others. There may be more than one decision point operating a decision point layer in a routing system. Decision point may represent any point in the system where some type of interaction with the caller occurs and is recorded.

Block 300 includes a final destination layer 303 that may be identical in components to layer 303 accept for a data forwarding module 316 for forwarding all of the associated data including call path history and interaction history to a data analyzing system. A final destination is any point in the routing process that is the last pint of interaction and results in satisfying the object of the call. The final destination may be an automated system or a live agent. It is typically the last point in a routing system, but it may also become an intermediate decision point in the system if it is determined that further routing is still required to satisfy the object of the call. Layer 303 therefore includes an interaction recorder 313, an XML generator 318, and an internal data tagger 315. It is clear that any routing point in a routing system where the present invention is practiced may also include a data-forwarding module 316 for forwarding data to a data analyzing system. For example, if a caller terminates a call at an intermediate decision point in the system, that point may be considered the final destination for that call resulting in call termination or lost call. That type information and the associated call path up to that point may still be analyzed and may still provide useful statistical information.

Final destination layer 303 provides the last call path and interaction result history for a call traversing the system. The end result of the call is a critical variable in the analyzing process. If the routing system is sales oriented, then the fact of whether the call ended in a sale or not is key to the generation of compiled statistics that also consider complete call route through the system and, in one embodiment, intermediate interaction results. As calls are disposed of in this example, the final destination reports the data associated with the call including complete call path through the system and the complete interaction history including the end result data to the analyzing system.

Block 304 includes a statistics layer 304 for receiving all of the call data and generating the most current statistics for the entire system. Layer 304 includes a data compiler 317 for compiling and sorting data received according to the characteristics of that data. Compiler 317 may work in cycles incorporating recent batches of data into one or more data analyzing cycles. In another embodiment, compiler 317 may constantly receive and sort new data as it is streamed in. A data analyzer receives the data from compiler 317 and analyzes it in light of the most recent statistics available, and a stat generator produces the latest up-to-date statistics based on the new information analyzed. A user interface (UI) adaptor 320 is provided within layer 304 for formatting the generated statistics for display on one or more user-operated system display screens.

In this example, layers 301 through 304 are distributed over all of the points of a routing system, each layer and components on one hop cooperating with the layers and components of a next hop and so on until the complete data sets for each event are available at final destinations. It will be apparent to one with skill in the art that layers 301 through 304 may instead be provided as a standalone application on a third party server or system without departing from the spirit and scope of the present invention. The third party system may be integrated into an existing routing system for the purpose of tracking communication events as routed through the system capturing the complete path through the system for each event and the interaction history sequence and final result of each event. In the later case, all that is required of the routing points in the system is that they are accessible to the third party system so that the system may track the calls and record any interactions that occurred at that monitored point. Once the call is disposed of at the final destination or otherwise concluded at any intermediate point in the system the complete data set for that call may be included in the analytic cycle.

In either of the described embodiments, overall system-wide statistics may be available by computer generated report or snapshot at any given time. In one embodiment, the overall statistics may be available in real time via a real simple syndicate (RSS) feed. In this embodiment, overall stats (percentages) may change in real time as most current analysis effects percentage totals. This embodiment is useful to administrators that may be monitoring the statistics looking for unnatural percentage drops or shifts, which may indicate a developing problem such as a bottleneck in the routing system.

There are a wide variety of presentation options and possible categories of statistics that may be made available. For example, overall call volume percentages may be provided for each entry point in the system, for each intermediate decision point in the system, and for each final destination point in the system. The call volume totals may, in addition, be sorted by specific call path through the system. Likewise, percentages may be further broken down by complete call path and specific interaction result pattern. For example, an administrator may request the closing percentage for all calls that entered the system through entry point A, chose option (c) at decision point B, and ended up at final destination C. Those percentages may then be compared with the percentages generated for all calls that wire routed through another path relevant to another specific option selected.

Figure 4:
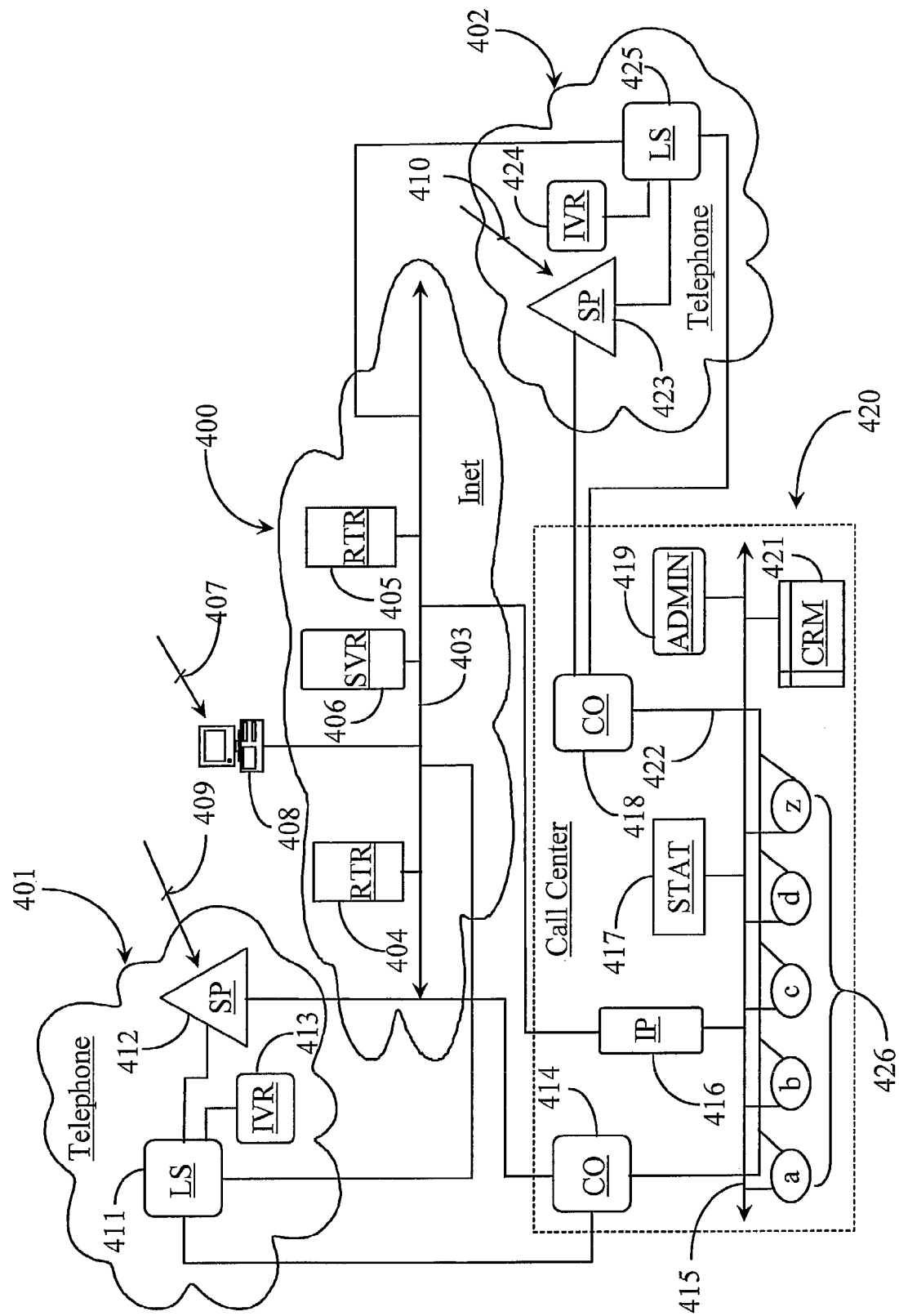
FIG. 4 is an architectural overview of an exemplary communications network practicing the present invention.

FIG. 4 is an architectural overview of an exemplary communications network on which the present invention may be practiced. The communications network includes Inet 400, telephone network 401 and telephone network 402. An Inet is any network that uses the Internet Protocol. Within AT&T, the word is often used as a convenient "umbrella" term that includes Internet, Intranet, and Extranet networks. Inet 400 may the Internet network in this exemplary architecture. Telephone networks 401 and 402 may be different geographic segments of the public switched telephone network. A call center 420 having a local area network (LAN) 415 completes the architecture. Call center 420 accepts calls and communication events from Inet 400 and telephone network segments 401 and 402.

LAN 415 supports an internet protocol (IP) router 416, a CRM database 421, an administrative workstation (ADMNIN) 419, and multiple live agent stations 426a-z for handling communication events. Center 420 includes two central office (CO) telephone switches in this example. These are CO switch 414 and CO switch 418. In this example, CO switch 414 has a telephony connection to a local telephone switch (LS) 411 in telephone network segment 401. LS 411 has connection to a service point 412 and has a hosted IVR capability 413. Calls destined for communication center 420 may arrive at service point 412 and then may be routed to LS 411 according to DNIS. In this case LS 411 would be a system entry point because of the IVR capability maintained at the network switch by communication center 420.

CO 418 in center 420 has a telephony connection to a LS 425 and directly to a SP 423 to illustrate variable connection possibilities. LS 425 has an IVR capability 424 maintained by the contact center 420 so LS 425 is another entry point to the routing system of center 420. IVR capability may also be provided within center 420 at CO switches 414 and 418 in addition to or instead of the local telephone network switches.

Inet 400 has a network backbone 403 that represents the lines, equipment, and access points to the network. Inet backbone 403 supports a connected server (SVR) 406, an IP router 404 and an IP router 405. Center 420 may handle calls 409 entering SP 412 and calls 410 entering SP 423. Center 420 may handle IP communication events 407 sourced from a computer 408 or other IP capable device. Communications events that may be subject to system routing, queuing and handling at agent stations 426a-z may include but are not limited to telephone calls, emails, instant messages, VoIP calls, chat requests and so on.

Agent stations 426a-z may include telephones, IP telephones, computer terminals, and other communications devices or systems. There may also be automated systems connected to LAN or telephony wiring 422 within center 420. In general practice of the present invention call or event tracking begins at a system entry point. If SP 412 is a system entry point, then LS 411 would be a decision point. CO 414 could be an intermediate decision point and agent stations 426a-z could be final destination points. For IP events routers 404 or 405 may be entry points, server 406 may be a first decision point, IP router 416 may be an intermediate decision point, and agent stations 426a-z may be final destinations.

If agent level routing is not extended into the external physical networks, then CO 414, CO 418, and IP router 416 may be system entry points and decision points. In the event of system entry points maintained externally from center 420, then access to CRM 421 would be available to those nodes. A center may have more than one separate routing system for communications and those separate systems may be classed as a single routing system in terms of identifying the entry points, decision points, and intermediate decision points included in the paths for the communication events handled by the center. Any level of granularity might be employed to break down all communications events into their media types, and nodes handling those media types. One reason to include class one routing system for statistical generation where that system actually includes more than one separate system and may handle different types of media is that if both systems have a common goal than one system may be statistically compared against the other. For example, the email routing system may be out performing the telephone routing system in sales transactions visible from overall statistics generated. The telephony "portion" of the system may be isolated and further studied running various breakdowns to determine whether it can be improved or if the sales resources should be dedicated entirely to the email system and the telephones only used for service.

By classing all routing systems in place in an enterprise as "the internal routing system", not only can each system be analyzed and fine tuned individually, but also decisions can be reached for optimizing the overall performance of all those individual systems combined using one application. Moreover, marketing personnel will have better data to rely on when deciding which media types or combinations of media type to use in special marketing campaigns. There are many possibilities.

In this exemplary architecture, it is assumed that the appropriate layers and components of the application are distributed over the nodes in the architecture designated as entry points, decision points, and final destinations. The complete data sets for each event would generally be forwarded to the statistical generation system as the events conclude at the final destinations. However, in another embodiment a LAN node may be provided and may be given access to all of the entry points, decision points and final destination points to monitor those points for traffic. The node running a complete application would be responsible for assembling the data paths for each event and the interaction histories of each event as they traverse the system. In either case, unexpected termination of an event at any point in the system may be tracked and the data collected or forwarded thus far for such an event may also be considered in the statistical analysis.

The methods and apparatus of the present invention may be practiced over any type of network or multi-network communications routing systems or multiple systems separately or classed as a single multi-media routing system without departing from the spirit and scope of the present invention. The service of the invention is scalable to include just one media type or all media types that are subject to routing and handling by agents and/or systems of the communications center. The system of the invention may be applied to public-access routing systems like public information services and the like as well as private systems requiring authentication to access like banks or other financial institutions. The spirit and scope of the present invention is limited only by the claims that follow.

What is claimed is:

1. A system for generating usage statistics for a communications routing system from data generated at routing points and at end points of the system comprising:
    a processor having access to the communications routing system for analyzing the data and generating the statistics; and
    a server having access to the processor for rendering the generated statistics into a format for display;
    wherein the data used to generate the statistics includes routing path information for events routed through the communications routing system and interaction histories recorded at routing points and end points in the communications routing system and the data generated at routing points and end points is generated in the form of an extensible markup language-based data set.

2. The system of claim 1, wherein the communications routing system is logically classed as a single multimedia routing system comprised of separate physical communications routing architectures each handling different media types.

3. The system of claim 2, wherein the communications routing system is one of a telephone routing system, an email routing system, or a voice over Internet protocol (VoIP) routing system.

4. The system of claim 1, wherein the routing points include system entry points and intermediate decision points and the end points are final destinations for events.

5. The system of claim 1, wherein the interaction histories include final results of event handling recorded at end points.

6. The system of claim 1, wherein the processor is a dedicated node having connection to each final destination point of the system.

7. The system of claim 1, wherein the processor has access to all of the routing points and end points of the system.

8. The system of claim 1, wherein the server and processor are components of a same machine.

9. In a communications routing system, a method for collecting route path information and interaction information of a communications event routed through the system for use in generating usage statistics comprising the acts:
(a) recording in a data storage unit by a computerized server, an identification and location of a system entry point at which the event first arrived into the system, and recording any interaction result produced at that entry point;
(b) generating by the computerized server machine-readable text of the recorded data;
(c) routing the event to a next routing point by a computerized routing processor;
(d) recording by the computerized server an identification and location of the next routing point to which the event is routed and any interaction result at that routing point;
(e) generating by the computerized server machine-readable text of the recorded data; and
(f) sending the aggregate machine readable text to a statistics generator.

10. The method of claim 9, wherein in act (a), the entry point is a telephone switch and the interaction is interactive voice response (IVR).

11. The method of claim 9, wherein in act (b), the machine-readable text is XML-based.

12. The method of claim 9, wherein in act (c), the determination of the next routing point is based at least in part on result of any interaction at the entry point.

13. The method of claim 9, wherein in act (c), the determination of the next routing point is a default routine.

14. The method of claim 9, wherein in act (d), the next routing point is an IVR system.

15. The method of claim 9, wherein in act (f), the aggregate text is assembled at each point and forwarded with the event to the next point, the aggregate forwarded when the point is a final destination for the event.

16. The method of claim 9, wherein in act (f) the aggregate of texts are assembled in a third party node monitoring the routing points when the event terminates, the aggregate then forwarded to the statistics generator.

17. The method of claim 9, wherein in act (a) the entry point is a Web server and the interaction is selection of an option on an electronic form.

18. A system for generating usage statistics for a communications routing system from data generated at routing points and at end points of the system comprising:
a processor having access to the communications routing system for analyzing the data and generating the statistics; and
a server having access to the processor for rendering the generated statistics into a format for display;
wherein the data used to generate the statistics includes routing path information for events routed through the communications routing system and interaction histories recorded at routing points and end points in the communications routing system and the routing points in the system include at least telephone switches, interactive voice response interfaces, and interactive queues.

19. The system of claim 18, wherein the communications routing system is logically classed as a single multimedia routing system comprised of separate physical communications routing architectures each handling different media types.

20. The system of claim 19, wherein the communications routing system is one of a telephone routing system, an email routing system, or a voice over Internet protocol (VoIP) routing system.

21. The system of claim 18, wherein the routing points include system entry points and intermediate decision points and the end points are final destinations for events.

22. The system of claim 18, wherein the interaction histories include final results of event handling recorded at end points.

23. The system of claim 18, wherein the processor is a dedicated node having connection to each final destination point of the system.

24. The system of claim 18, wherein the processor has access to all of the routing points and end points of the system.

25. The system of claim 18, wherein the server and processor are components of a same machine.

26. A system for generating usage statistics for a communications routing system from data generated at routing points and at end points of the system comprising:
a processor having access to the communications routing system for analyzing the data and generating the statistics; and
a server having access to the processor for rendering the generated statistics into a format for display; and
a software application distributed in parts to routing points and end points of the communications routing system, the distributed parts responsible for data aggregation;
wherein the data used to generate the statistics includes routing path information for events routed through the communications routing system and at least interaction histories recorded at the routing points and the end points in the communications routing system forwarded to the server by the software application.

27. The system of claim 26, wherein the communications routing system is logically classed as a single multimedia routing system comprised of separate physical communications routing architectures each handling different media types.

28. The system of claim 27, wherein the communications routing system is one of a telephone routing system, an email routing system, or a voice over Internet protocol (VoIP) routing system.

29. The system of claim 26, wherein the routing points include system entry points and intermediate decision points and the end points are final destinations for events.

30. The system of claim 26, wherein the interaction histories include final results of event handling recorded at end points.

31. The system of claim 26, wherein the processor is a dedicated node having connection to each final destination point of the system.

32. The system of claim 26, wherein the processor has access to all of the routing points and end points of the system.

33. The system of claim 26, wherein the server and processor are components of a same machine.

* * * * *

UNITED STATES PATENT AND TRADEMARK OFFICE
CERTIFICATE OF CORRECTION

PATENT NO. : 7,573,990 B2  Page 1 of 1
APPLICATION NO. : 11/462316
DATED : August 11, 2009
INVENTOR(S) : Brian Galvin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this

Seventh Day of September, 2010

David J. Kappos
*Director of the United States Patent and Trademark Office*